US006836086B1

United States Patent
Goldberg et al.

(10) Patent No.: US 6,836,086 B1
(45) Date of Patent: Dec. 28, 2004

(54) CONTROLLED STARTING SYSTEM FOR A GAS TURBINE ENGINE

(75) Inventors: Gary Lester Goldberg, San Diego, CA (US); Tarrence L. Mack, Santee, CA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 126 days.

(21) Appl. No.: 10/094,490

(22) Filed: Mar. 8, 2002

(51) Int. Cl.[7] .............................. H02P 5/20; H02P 5/22
(52) U.S. Cl. ...................... 318/141; 318/139; 318/140; 318/445; 318/799; 318/800; 60/39.01; 60/39.15
(58) Field of Search ................................ 318/139, 140, 318/141, 445, 799–812; 60/39.02, 39.06, 39.01, 39.15; 320/44; 322/1–17

(56) References Cited

U.S. PATENT DOCUMENTS

| | | | |
|---|---|---|---|
| 3,812,378 A | 5/1974 | Coman | |
| 4,743,777 A | 5/1988 | Shilling et al. | |
| 4,827,897 A | * 5/1989 | Yamada et al. | 123/497 |
| 4,841,216 A | 6/1989 | Okada et al. | |
| 5,015,156 A | 5/1991 | Scholz | |
| 5,051,670 A | 9/1991 | De Piola | |
| 5,092,748 A | 3/1992 | Simmons, II | |
| 5,152,141 A | * 10/1992 | Rumford et al. | 60/39.02 |
| 5,184,456 A | * 2/1993 | Rumford et al. | 60/39.02 |
| 5,338,165 A | 8/1994 | Brockner et al. | |
| 5,456,234 A | * 10/1995 | Kodama et al. | 123/497 |
| 5,495,163 A | 2/1996 | Rozman et al. | |
| 5,593,287 A | 1/1997 | Sadakata et al. | |
| 5,722,228 A | * 3/1998 | Lampe et al. | 60/39.06 |
| 5,818,116 A | 10/1998 | Nakae et al. | |
| 5,844,383 A | * 12/1998 | Denaci | 318/139 |
| 5,865,160 A | * 2/1999 | Kato | 123/516 |
| 5,899,411 A | 5/1999 | Latos et al. | |
| 5,920,162 A | 7/1999 | Hanson et al. | |
| 5,977,645 A | 11/1999 | Glennon | |
| 6,018,199 A | 1/2000 | Shiroyama et al. | |
| 6,118,238 A | 9/2000 | Munro et al. | |
| 6,169,332 B1 | 1/2001 | Taylor et al. | |
| 6,242,881 B1 | 6/2001 | Giordano | |
| 6,265,786 B1 | 7/2001 | Bosley et al. | |
| 6,285,089 B1 | 9/2001 | Nelson | |
| 6,357,219 B1 | * 3/2002 | Dudd et al. | 60/39.141 |
| 2001/0006292 A1 | 7/2001 | Inaba et al. | |
| 2001/0024075 A1 | 9/2001 | Caamano | |

* cited by examiner

Primary Examiner—David Martin
Assistant Examiner—Tyrone Smith
(74) Attorney, Agent, or Firm—Carlson, Gaskey & Olds

(57) ABSTRACT

A starting system and method for a gas turbine engine includes a controlled starter system and a controlled fuel system. The controlled starter motor is accelerated along an acceleration profile to a dwelling point. Concurrently with the starter motor spinning up the gas turbine engine rotor, the fuel system controller commands the pump motor to drive the fuel pump at a speed which fills the fuel line volumes and establishes adequate pressure for fuel atomization at light off. As the fuel pump motor and starter motor are independently controlled and coordinated the starter motor maintains the gas turbine engine at the predetermined dwelling point until ignition occurs. The starter motor also provides a controlled amount of assisting torque during acceleration of the gas turbine to minimize thermal transients which thereby increased the gas turbine engine operational life.

22 Claims, 3 Drawing Sheets

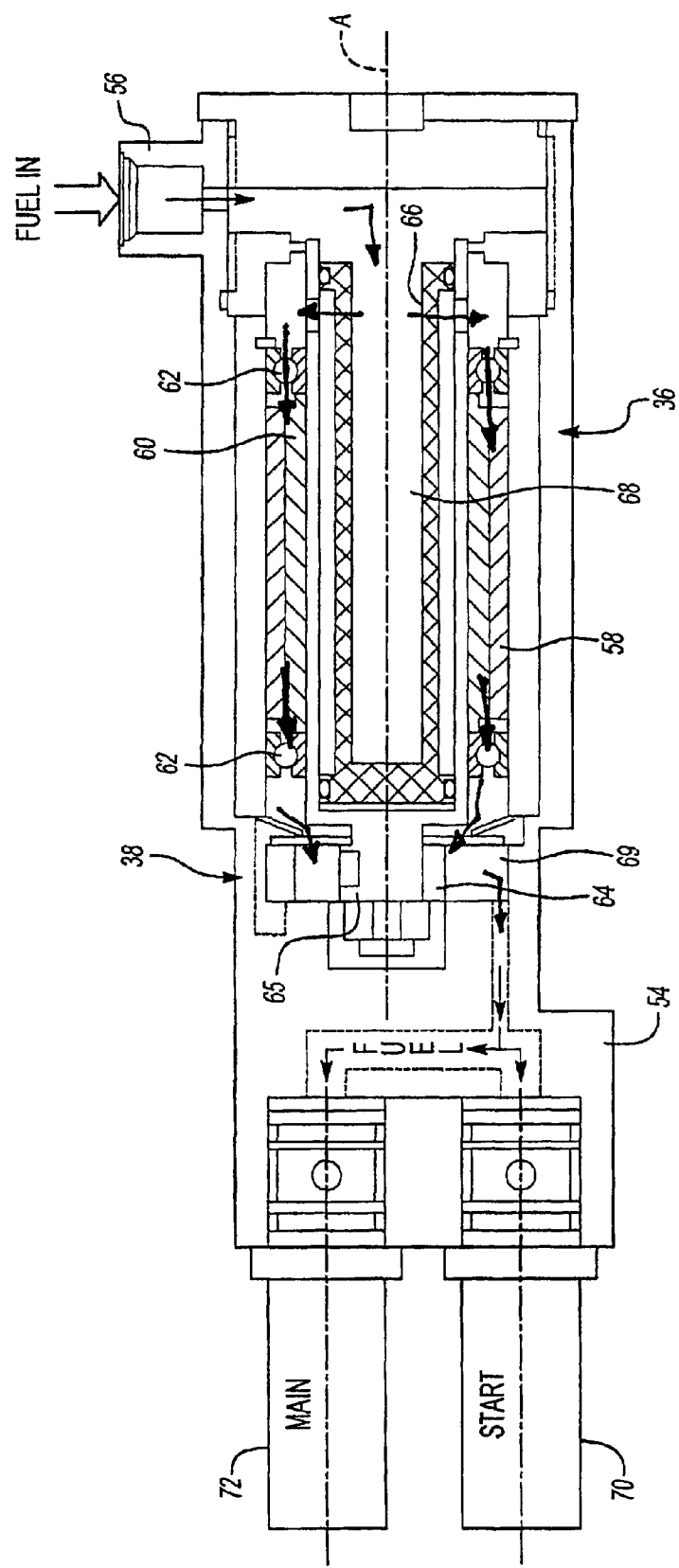

CONTROLLED STARTING SYSTEM FOR A GAS TURBINE ENGINE

BACKGROUND OF THE INVENTION

The present invention relates to a starter system for a gas turbine engine, and more particularly to an independently controllable starter system and fuel system for an auxiliary power unit.

In a conventional start system for a gas turbine engine, for example, one used in an auxiliary power unit, a start sequence that coordinates engine speed, ignition and fuel delivery is required to achieve a reliable start. Conventionally, a dedicated starter motor or a starter-generator, is drivably coupled to the gas turbine engine and is operated to produce rotation thereof. As the starter accelerates the engine, a fuel delivery pump driven by a gearbox attached to a rotor of the gas turbine engine provides fuel flow thereto. Igniters are then actuated to effect ignition in a combustor of the engine. Upon successful ignition, and once the engine has reached a self-sustaining speed, the starter is disengaged.

For successful ignition, engine speed and fuel delivery must be coordinated to provide an air fuel mass mixture at the igniter which is capable of sustaining combustion. The range of engine speeds at which starting is most likely to occur is referred to as the "light off window" and typically ranges from 5%–20% of rated engine speed. If the starter accelerates too quickly through the light off window, the gearbox driven fuel pump may have insufficient time to deliver fuel into the fuel system, thereby resulting in failed ignition.

Typical gearbox driven fuel pumps are sized to provide fuel at relatively low pump speeds for filling fuel lines and atomization at the igniters for light off. Disadvantageously, the low speed flow requirement results in a rather large fuel pump which requires recirculation during normal operating conditions. Recirculation creates complex thermal conditions during operation which further complicates the system. This is particularly disadvantageous to the design of a compact APU system Further, a high power starter is often necessary to ensure engine start on a cold day and/or when a battery supply is low. However, the same starter will be capable of very fast engine acceleration on a warm day with a fully charged battery which results in reducing the light off window. A gas turbine igniter typically operates at a rate of 3 to 10 discharges per second. Rapid acceleration through the light off window therefore limits the number of igniter discharges occurring within the window, which may further reduce the likelihood of successful ignition.

The high torque capability of the starter may also exceed the maximum rating of the gearbox which may not be safely operated during the start-up procedure. Thus, while the electrical loads could be safely operated during steady state operation, the starter motor portion of the generator could not operate safely during the start-up procedure. Providing a gearbox for the higher torque rating would result in added weight and prohibitive cost to retrofit existing aircraft or new aircraft using this same engine.

Accordingly, it is desirable to provide a starting system for an gas turbine engine which prolongs the duration of the light off window and provides a controlled dwelling point to ensure start reliability and minimize thermal shock.

SUMMARY OF THE INVENTION

The starting system for a gas turbine engine according to the present invention provides a controlled starter system and a controlled fuel system. Each system includes an independent controller which operates each respective system. The controlled starter system generally includes a brushless DC starter motor which is directly connected to a rotor of the gas turbine engine to provide torque thereto. The fuel system generally includes a pump motor which communicates with the fuel system controller to drive a fixed displacement fuel pump at variable speeds to supply fuel to the gas turbine engine independent of engine speed. As the fuel pump is independently controlled, a fuel recirculation system is avoided or minimized. System weight and complexity and power consumption is thereby decreased and undesirable thermal conditions are avoided.

In operation, a start sequence is initiated by a start command such that the starter system controller commands the starter motor to provide a controlled torque to the rotor of the gas turbine engine rotor. The controlled starter motor is accelerated along an acceleration profile to a dwelling point. Concurrently with the starter motor spinning up the gas turbine engine rotor, the fuel system controller commands the pump motor to drive the fuel pump to establish adequate fuel pressure for atomization and light off. As the fuel pump motor and starter motor are independently controlled and coordinated, the starter motor maintains the gas turbine engine at the predetermined dwelling point until ignition occurs. In other words, the light off window does not close because the controlled starter motor is varied to maintain the gas turbine engine at the dwelling point until ignition occurs.

Once ignition is detected, the pump motor is controlled such that the fuel pump provides a fuel flow to smoothly accelerate the gas turbine engine. The starter motor also provides a controlled amount of assisting torque during acceleration of the gas turbine engine. The assisting torque assures optimization and coordination of the fuel schedule and gas turbine engine acceleration to minimize thermal transients to the turbine rotor which thereby increases operational life.

The fuel pump for the present invention is preferably a brushless DC motor having an external stator winding within which is a rotatably mounted a tubular armature. A filter is mounted for rotation within the armature. Flow through the filter is driven by the centrifugal force of the rotating armature which eliminates the requirement for a separate boost pump.

The present invention therefore provides a starting system for a gas turbine engine which independently coordinates and controls operation of a starter motor and fuel pump to prolong the duration of the light off window and provide a controlled dwelling point to ensure start reliability and minimize thermal shock.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 3 is a perspective partial cross sectional view of a fuel pump for use with the fuel system illustrated in FIG. 2.

DETAILED DESCRIPTION OF THE PREFERRED EMBODIMENT

Figure 1:
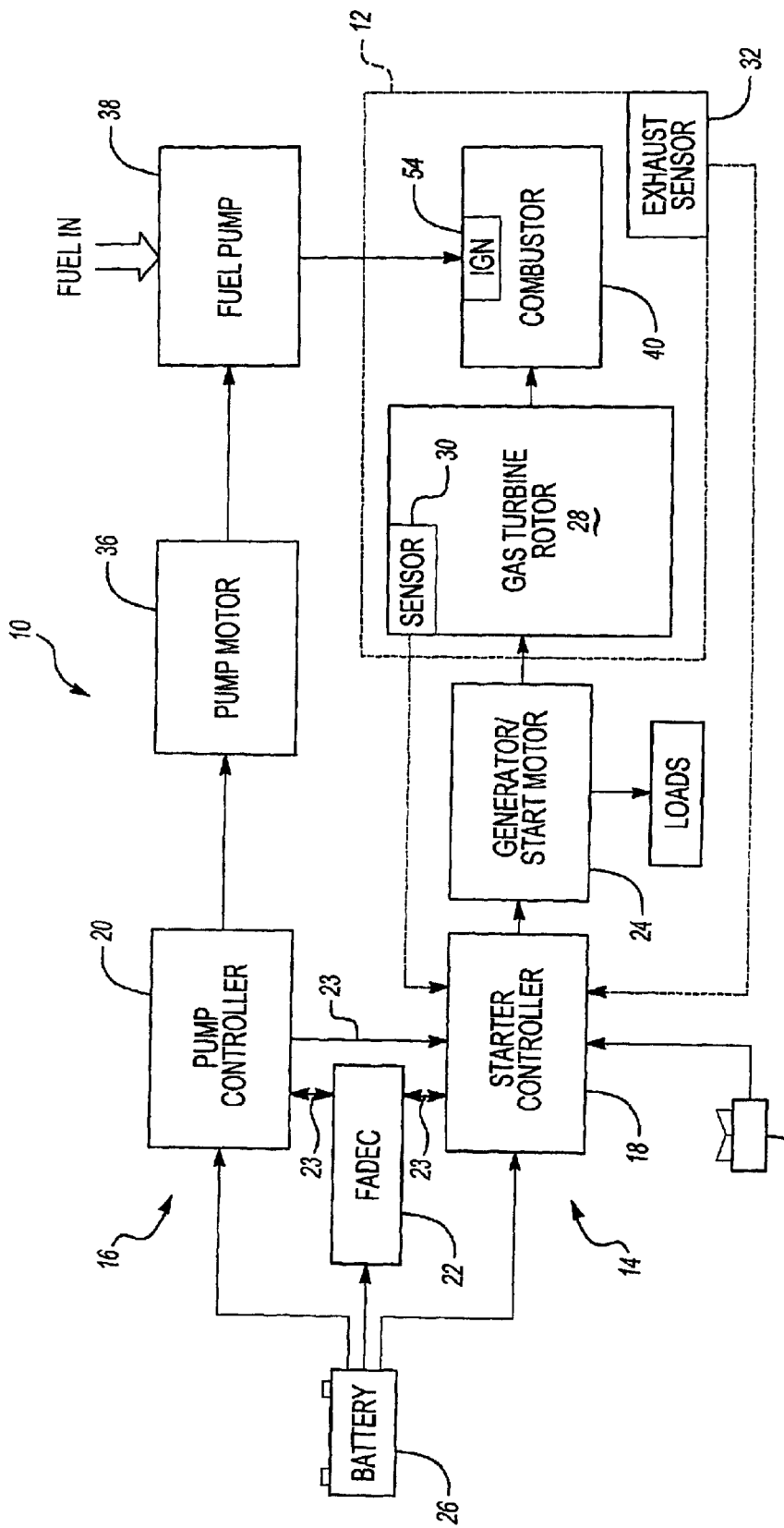
FIG. 1 is a schematic block diagram of a starting system for a gas turbine engine according to the present invention.

FIG. 1 illustrates a general schematic view of a starting system 10 for a gas turbine engine 12 such as an auxiliary power unit (APU.) The starting system 10 generally includes a controlled starter system 14 and a controlled fuel system 16. Each system 14, 16 preferably includes an independent controller 18, 20 which operates each respective system. The controllers 18,20 maybe implemented by a suitably programmed microprocessor or any other processing device, together with any interface apparatus necessary to control the respective system 14, 16 and sensors therefore. The controllers 18,20 additionally or alternatively communicate with each other through a central controller such as a full authority digital electronic control (FADEC) 22. Preferably, the controllers 18, 20, 22 include closed loop feedback systems (FIG. 2)having linear control system logic such as proportional integral, derivative (PID) paths to achieve the desired response and compensate for undesired destabilization forces. It should be understood that various controller and sensor arrangements will benefit from the present invention. Although schematically illustrated separately, the controllers maybe combined into a single internal controller. The controllers communicate over a communication bus or the like (illustrated schematically at 23).

The controlled starter system 14 generally includes a starter motor 24 which receives electrical power from a power source 26 such as a battery or other AC or DC power source at a preferred 28 volts. The starter motor 24 preferably includes a brushless DC starter motor which is directly connected to a rotor (illustrated schematically at 28) of the gas turbine engine 12 to provide torque thereto. That is, operation of the starter motor directly rotates the rotor 28 without an intermediate gearbox, clutch or the like.

As the starter motor 24 is a brushless DC starter motor, the allowable motor speed is greatly increased. Once the gas turbine engine 12 achieves operating speed, the starter motor 24 is preferably operated as an electrical generator to power various loads generated by the starting and fuel systems or other vehicle components. Moreover, the elimination of an intermediate gearbox decreases weight and complexity.

The starter motor 24 is responsive to signals supplied by the starter system controller 18. The starter system controller 18 communicates with a sensor suite, such as a speed sensor 30 which senses the speed of the rotor 28 and a temperature sensor 32 which senses the exhaust gas temperature of the gas turbine engine 12. It should be understood the sensor suite may additionally or in the alternative comprise a multiple of other sensors. The starter system controller 18 is further responsive to a command signal which may be developed through manual actuation of a switch (illustrated schematically at 34) to initiate or terminate a start sequence.

The fuel system 16 generally includes a pump motor 36 which communicates with the fuel system controller 20 to drive a fixed displacement fuel pump 38 at variable speeds to supply fuel to the combustor 40 independent of the gas turbine engine speed. The pump rotor 36 is preferably a 3 phase brushless motor (FIG. 3). Varying the power to the pump motor 36 controls the operation of the fuel pump 38. That is, as the fuel pump is not driven by a gas turbine engine gear box, fuel flow is not a function of the gas turbine engine speed. Moreover, the fuel pump 38 of the present invention is preferably sized for a predetermined operating speed of the gas turbine engine 12 as it need not be oversized to provide the fuel flow required for start up at the typical low start-up pump speed. The present invention therefore provides a fuel pump which is approximately one-third smaller than conventional fuel pumps which are sized to fill fuel lines and atomize the fuel at the relatively low starting speeds. Moreover, as the fuel pump of the present invention is independently controlled a fuel recirculation system is avoided or minimized. System weight and complexity is thereby decreased and undesirable fuel heating conditions are avoided. Remote mounting is also available due to disassociation of the fuel pump from the gas turbine engine 12 and the increased flow capability of the independently operable pump.

Figure 2:
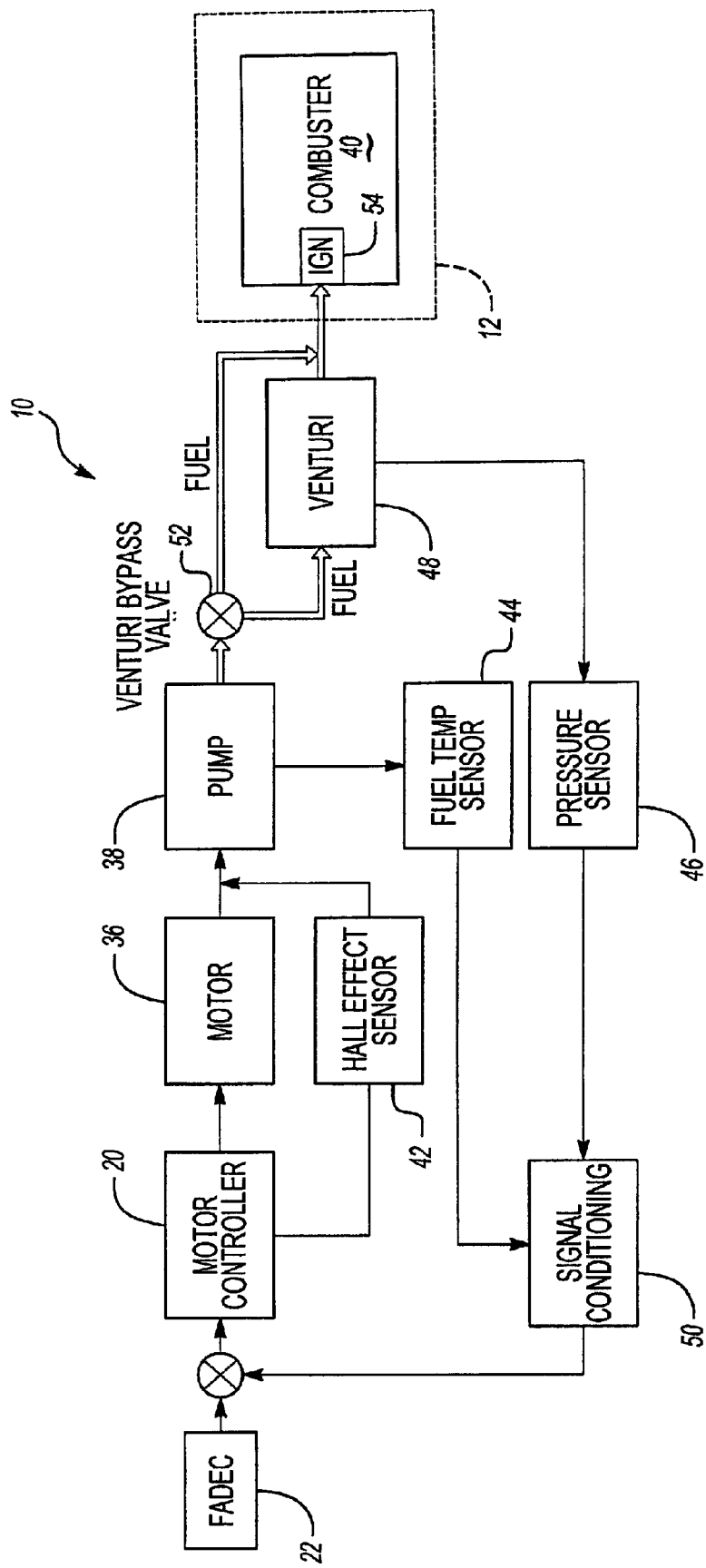
FIG. 2 is schematic block diagram of the starting system fuel system illustrated in FIG. 1.

Referring to FIG. 2, the pump motor 36 is responsive to signals supplied by the fuel system controller 20. The fuel system controller 20 communicates with a sensor suite, including a hall effect sensor 42, a fuel temperature sensor 44, a pressure sensor 46 which communicates with a venturi 48 downstream of the fuel pump 38. The hall effect sensor 42 assures accurate commutation of the pump motor 36 to provide accurate speed control thereof. The fuel temperature sensor 44 determines the temperature of the fuel and the pressure sensor 46 determines the pressure of the fuel passing through the venturi 48. Preferably, signals from the sensors are communicated though a signal conditioning circuit 50 prior to communication with the fuel system controller 20. Signal conditioning is well known in PID logic paths to assure proper limited operation of a system. It should be understood the fuel system sensor suite may additionally in the alternative comprise a multiple of other sensors to assure proper operation and control of the fuel system 16.

The venturi 48 provides accurate fuel flow rate measurement such that ignition and acceleration are accurately controlled. A venturi bypass valve 52 is preferably provided between the venturi 48 and the fuel pump 38. The venturi bypass valve 52 allows fuel flow to be supplied to a plurality of igniters (illustrated schematically at 54) within the combustor 40. Once the gas turbine engine 12 is properly started and accelerated to normal operating speed, fuel flow is transitioned to a main fuel flow path and the restriction provided by the venturi 48 may be eliminated.

In operation, a start sequence according to the present invention is initiated by a start command such as by actuation of the start switch 34 (FIG. 1.) The starter system controller 18 commands the starter motor 24 to provide a controlled torque to the rotor 28 of the gas turbine engine rotor 12. The gas turbine engine 12 is accelerated to a predetermined dwelling point to await ignition. Preferably, the dwelling point is approximately 7 percent of the gas turbine engine 12 normal operating speed, however, as the starter motor 24 is directly controlled, the dwelling point is adjusted based upon correction factors such as ambient pressure, temperature, altitude, or the like to achieve reliable ignition. The correlation factors are preferably calculated by the controllers 18, 20, 22. Such correction greatly increases light off reliability.

The controlled starter motor 24 (FIG. 1) is preferably accelerated along an acceleration profile which provides a relatively shallow torque increase. An acceleration may provide for a gas turbine engine acceleration which, for example only, decreases the starter motor power consumption from its DC power source. A relatively smaller power source may thereby be provided to minimize system weight. Moreover, starting inconsistencies due to a single acceleration profile series DC motor (which provides high torque at startup and lower torque as the motor speed increases) and a battery having a variable power output due to usage or environmental conditions is avoided. It should be understood that the present invention provides for a multitude of controlled torque distribution profiles based upon numerous factors to further improve light off performance. The profiles one preferably stored in, or calculated by the controllers 18, 20, 22.

Concurrently with the starter motor spinning up the gas turbine engine rotor 28, the fuel system controller 20 commands the pump motor 36 to drive the fuel pump 38 at a speed which fills the fuel line volumes and establishes adequate pressure for fuel atomization at light off. As the fuel pump motor and starter motor are independently controlled—though preferably coordinated—the starter motor 28 maintains the gas turbine engine at the predetermined dwelling point until ignition occurs. In other words, the light off window is maintained indefinitely because the controlled starter motor is controlled to drive the gas turbine engine at the dwelling point until ignition occurs.

Once ignition is detected, the pump motor 36 is controlled such that the fuel pump 38 provides a controlled fuel flow to smoothly accelerate the gas turbine engine 12. As described above, the controllers 18, 20, 22 preferably coordinate the acceleration of the gas turbine engine through communication with the sensors in response to a PID closed loop control. Control may also be implemented in a non-microprocessor based electronic system (either digital or analog).

Preferably, the starter motor 24 (FIG. 1) provides a controlled amount of assisting torque during acceleration of the gas turbine engine. The assisting torque assures optimization and coordination of the fuel schedule and acceleration of the gas turbine engine to minimize thermal transients which thereby increased the gas turbine engine operational life. Once the gas turbine engine has achieved a self-sustaining speed of approximately 50 percent power, the starter motor is powered down and begins operation as an electrical generator powered by the gas turbine engine 12.

The gas turbine engine 12 continues acceleration to it normal operating speed of 100 percent. Control of the gas turbine engine is then transitioned to a constant speed mode where engine speed is constant or variable as required by the applied electrical load as is known. Shut down may thereafter be independently achieved by shut down of the pump motor.

Referring to FIG. 3, the fuel pump 38 is illustrated in cross section. The pump motor 36 and the fuel pump 38 are preferably housed in an aluminum housing 54 to provide a compact lightweight unit. The housing 54 defines a fuel inlet 56 as the as the rotor 60 is preferably immersed in fuel to provide cooling and eliminate the requirement of a rotating seal member. The fuel pump motor 36 is preferably a brushless DC motor having an external stator winding 58 within which is a rotatably mounted a tubular permanent magnet armature 60. The armature 60 is mounted upon bearings 62 or the like to minimize rotational friction.

The armature 60 is rotationally connected to a pump rotor 64 through a hollow tubular shaft 65. A filter 66 is preferably mounted for rotation with the armature 60 about an axis A such that the armature 60 and filter 66 are located within a fuel passage 68 defined from the fuel inlet 56 to the pump rotor 64. The filter 66 filters the fuel prior to entering a pump rotor cavity 69 of the fuel passage 68 eliminating the potential for damage to the pump rotor 64 or having ferric contamination attracted to the magnets and possibly interfering with the motor air gap. Flow through the filter 66 is driven by the centrifugal force of the rotating armature 60 which eliminates the requirement for a boost pump. From the pump rotor cavity 69 fuel is directed to a start fuel solenoid valve 70 and a main fuel solenoid valve 72 for supply to the combustor 40 (FIG. 2) as controlled by the fuel system controller 20 or FADEC 22.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A starting system for a gas turbine engine comprising: a fuel system controller; a fuel pump for delivering fuel to a gas turbine engine said fuel pump comprising a fixed displacement pump including a rotatable armature and a filter said filter rotatable with the rotatable armature; a starter system controller; a fuel pump motor in communication with said fuel system controller, said fuel pump motor operable to drive said fuel pump in response to said fuel system controller at a pump speed independent of a speed of said gas turbine engine; a starter system controller; and a brushless starter motor which provides a controlled amount of assisting torque to drive said gas turbine engine in response to said starter system controller.

2. The starting system as recited in claim 1, wherein said brushless starter motor is directly mounted to a main rotor of said gas turbine engine.

3. The starting system as recited in claim 1, wherein said brushless starter motor comprises a starter generator drivable by said gas turbine engine to power an electrical load.

4. The starting system as recited in claim 1, wherein said fuel system controller is in communication with said starter system controller.

5. The starting system as recited in claim 1, wherein said fuel system controller and said starter system controller are in communication with a full authority digital electronic control.

6. The starting system as recited in claim 5, wherein said fuel pump is sized for a predetermined operating speed of said gas turbine engine.

7. The starting system as recited in claim 5, wherein said fuel pump comprises a single stage pump.

8. A starting system for a gas turbine engine comprising:
a fuel system controller;
a fuel pump for delivering fuel to a gas engine;
a fuel pump motor in communication with said fuel system controller, said fuel pump
motor operable in drive said fuel pump in response to said fuel system controller
at a pump speed independent of a speed of said gas turbine engine;
a starter system controller;
a brushless starter motor which provides a controlled amount of assisting torque to drive said gas turbine engine in response to said starter system controller; and
a flow sensing venturi between said fuel pump and said gas turbine engine, said flow sensing venturi in communication with said fuel system controller.

9. A method of starting a gas turbine engine comprising the steps of:
(1) controlling a speed of a brushless starter motor along an acceleration profile during a start sequence to drive a gas turbine engine to a dwelling point within a light off window;
(2) controlling a fuel pump motor to drive a fuel pump at a predetermined speed;

(3) actuating an igniter after the gas turbine engine achieves the dwelling point to achieve light off; and (4) controlling the speed of the brushless starter motor and the speed of the fuel pump after said stop (3) to accelerate the gas turbine engine to an operating speed.

10. A method as recited in claim 9, further comprising the step of turning off the brushless starter motor when the gas turbine engine achieves a predetermined speed, the predetermined speed below the operating speed.

11. A method as recited in claim 10, further comprising the step of operating the starter motor as a generator after the gas turbine engine achieves the predetermined speed.

12. A method as recited in claim 10, wherein the predetermined speed is a self-sustaining speed.

13. A method as recited in claim 9, wherein said step (4) comprises controlling the brushless starter motor to minimize thermal transients in the gas turbine engine.

14. A method as recited in claim 9, wherein said step (4) comprises controlling the brushless starter motor to provide a controlled amount of assisting torque to drive the gas turbine engine after said step (3).

15. A method as recited in claim 9, wherein said step (4) comprises controlling the fuel pump in response to an exhaust temperature of the gas turbine engine.

16. A method as recited in claim 9, further comprising the step of adjusting the dwelling point in response to an ambient pressure.

17. A method as recited in claim 9, wherein said step (1) comprises controlling the acceleration profile of the brushless starter motor to control a power consumption from a battery.

18. A method as recited in claim 9, wherein said step (1) and said step (2) are performed simultaneously.

19. A method as recited in claim 9, wherein said step (1) comprises accelerating the gas turbine engine to a predetermined dwelling point to await ignition.

20. A starting system for a gas turbine engine comprising: a fuel system controller; a fuel pump for delivering fuel to a gas turbine engine said fuel pump comprising a fixed displacement pump including a rotatable armature and a filter said filter rotatable with the rotatable armature; a starter system controller; a fuel pump motor in communication with said fuel system controller, said fuel pump motor operable to drive said fuel pump in response to said fuel system controller at a pump speed independent of a speed of said gas turbine engine said fuel pump is sized for a predetermined operating speed of said gas turbine engine; a starter system controller; and a brushless starter motor which provides a controlled amount of assisting torque to drive said gas turbine engine in response to said starter system controller.

21. A starting system for a gas turbine engine comprising: a fuel system controller; a fuel pump for delivering fuel to a gas turbine engine said fuel pump comprising a fixed displacement pump including a rotatable armature and a filter said filter rotatable with the rotatable armature; a starter system controller; a fuel pump motor in communication with said fuel system controller, said fuel pump motor operable to drive said fuel pump in response to said fuel system controller at a pump speed independent of a speed of said gas turbine engine, wherein said fuel pump is responsive to a fuel system controller of said gas turbine engine; a starter system controller; and a brushless starter motor which provides a controlled amount of assisting torque to drive said gas turbine engine in response to said starter system controller.

22. A method as recited in claim 19, wherein said step (1) comprises accelerating the gas turbine engine to a predetermined dwelling point to await ignition.

* * * * *

UNITED STATES PATENT AND TRADEMARK OFFICE
CERTIFICATE OF CORRECTION

PATENT NO. : 6,836,086 B1
DATED : December 28, 2004
INVENTOR(S) : Goldberg et al.

It is certified that error appears in the above-identified patent and that said Letters Patent is hereby corrected as shown below:

Column 6,
Line 49, the first occurrence of "in" should read as -- to --.

Column 7,
Line 4 "stop" should read as -- step --.

Signed and Sealed this

Nineteenth Day of April, 2005

JON W. DUDAS
*Director of the United States Patent and Trademark Office*